Patented May 13, 1924.

1,493,708

UNITED STATES PATENT OFFICE.

LOUIS SCHNEIDER, OF BARNARD, NEW YORK.

WATER GLASS AND ITS PROCESS OF PRODUCTION.

No Drawing.   Application filed February 19, 1921.   Serial No. 446,457.

*To all whom it may concern:*

Be it known that I, LOUIS SCHNEIDER, of Barnard, in the county of Monroe and State of New York, have invented certain new and useful Improvements in Water Glass and its Processes of Production; and I do hereby declare the following to be a full, clear, and exact description of the same.

My invention relates to those silicates of potassium and sodium which are also known as water glasses. The object of the present invention is to simplify and cheapen the method of forming these silicates and of changing their concentration and ratio of components. Another object is to produce a process and its resultant product, of making the same in a more stable form and more convenient to handle. To these and other ends the invention resides in certain improvements and combinations of parts, all as will be hereinafter more fully described, the novel features being pointed out in the claims at the end of the specification.

Water glass is widely used today in several important industries, more often in its liquid form or in solution. Uncertainty has been expressed as to the constitution of water glass even by the more recent investigators, but it is my opinion that in the liquid form water glass is primarily a solution of sodium meta-silicate and a colloidal solution of silicic acid, while the solid or powdered form of water glass consists of hydrated sodium meta-silicate and a dehydrated silicic acid hydrogel. The liquid form is bulky and inconvenient for shipment and for this reason powdered water glass or an equivalent solid mixture would be more desirable because better adapted for transportation and requiring cheaper containers. But such powdered water glass is subject to the disadvantage of being expensive to make by some of the present methods of production, such as the hydration, crystallization or the dehydration processes.

This invention provides an economical solid mixture adapted to form water glass of a desired concentration upon the addition of water in proper proportion.

The first step of my invention in the production of water glass consists in mixing hydrated sodium oxide, or caustic soda (NaOH) with a hydrated silica or an incompletely-dehydrated-silicic-acid-hydrogel ($SiO_2 \cdot XH_2O$). A pure hydrated silica is preferably employed by which is meant one that is substantially free from insoluble matter, impurities forming precipitates, and gives to its solution low turbidity and good color. The hydrated silica is selected because attainable in soluble form and should have a moisture content preferably from 1 to 15% by weight to lessen the shipping weight and also to aid in dissolving. The powdered mixture thus formed is easily soluble to form the liquid water glass. If a greater than 15% moisture content is present in the hydrated silica the substance is not conveniently stable for some uses. I prefer to use lower than this amount of moisture in the hydrated silica because the lower the moisture content the greater will be the heat of reaction on dissolving. When much lower than about 1% of moisture is present in the hydrated silica some portions thereof may be anhydrous and therefore not readily soluble. The incompletely-dehydrated-silicic-acid-hydrogel may be obtained as a byproduct, for example, in the preparation of sodium fluoride from hydrofluosilicic acid, or it may be found substantially pure in nature. The powdered mixture just described may be transported more readily than liquid water glass and is adapted to form the liquid water glass merely by the addition of water. But my method is not necessarily limited to the formation of the powdered mixture since the later mentioned advantages accrue if the substantially pure incompletely-dehydrated-silicic-acid-hydrogel be added to a solution of sodium hydroxide directly without the formation of the powder. The powdered mixture is desirable because predetermined parts of caustic soda and hydrated silica may be mixed to insure a water glass having the desired ratio of $Na_2O:SiO_2$ and a desired percentage of concentration or solid contents when added to a given amount of water.

An advantage of the present method of making liquid water glass is that the ratio $Na_2O:SiO_2$ may be easily varied by changing the amount of the hydrated silica. Another advantage of my method of producing liquid water glass is that its concentration may be easily controlled and greater concentration thus easily and directly obtained than had been previously known. For example, by my invention a concentration or solid contents of 35% may be obtained with a 1 to 3 ratio of $Na_2O:SiO_2$ (analytically stated). Should impure hydrated silica be used with the sodium hydroxide to form liquid water glass, not only would objectionable impurities precipitate out of solution and require additional treatment to remove them, but some of the impurities often precipitate out and jell, and because of the latter condition prevent the formation of the desired ratio of $Na_2O:SiO_2$, solid content or viscosity. With the incompletely-dehydrated-silicic-acid-hydrogel a desired ratio of $Na_2O:SiO_2$ may be obtained more easily in concentrations than heretofore. In formation of the liquid water glass from my mixture, additional pressure or heat is not necessary, but higher temperatures may be used if it is desired to hasten the process.

The powdered water glass or the mixture described above has the advantage that it may be formed into a block, cake, or tablet by the application of great pressure, preferably from 1,000 to 10,000 pounds per square inch for a short period of time, say 4 or 5 seconds, or long enough to allow the air to be forced out. All data or values given in this specification for pressure, time, percentage of moisture, density, etc., are true for a 1 to 3 ratio of the $Na_2O:SiO_2$ but my invention covers other ratios than this.

The compounds of potassium and their use to form water glass is regarded as the equivalent of the compounds of sodium referred to in the foregoing specification and throughout the appended claims.

I claim as my invention:

1. The process of making water glass by mixing in a dry state caustic soda with an incompletely dehydrated-silicic-acid-hydrogel and subsequently adding water to produce the desired concentration.

2. The process of making water glass by mixing in a dry state solid caustic soda with solid hydrated silica and adding water to produce the desired concentration.

3. A mixture of powdered caustic soda and powdered incompletely-dehydrated-silicic-acid-hydrogel which is stable and completely soluble.

4. The process of making a powdered mixture for producing water glass adapted to give different values for the ratio $NaO_2:SiO_2$ which comprises mixing in a dry state different quantities of dehydrated-silicic-acid-hydrogel with caustic soda.

5. The process of making water glass which comprises mixing in a dry state hydrated sodium oxide with a completely soluble hydrated silica, and adding water in proper proportion to obtain the desired concentration.

6. The process of making solid water glass which comprises mixing powdered caustic soda with a powdered incompletely-dehydrated-silicic-acid-hydrogel having a water content of substantially 1 to 15 per cent.

7. The process of forming water glass having a ratio $Na_2O:nSiO_2$ in which n has a value substantially of from 1 to 3, which comprises selecting a predetermined quantity of an incompletely-dehydrated-silicic-acid-hydrogel and mixing the same with a definite amount of caustic soda and adding water in the proper proportion to obtain the desired concentration.

8. The process of making water glass by mixing hydrated sodium oxide and hydrated silica having a moisture content of not more than 15% by weight, and subsequently adding water to produce the desired concentration.

9. A mixture of hydrated sodium oxide, and hydrated silica having a moisture content of not more than 15% by weight, adapted to form a liquid water glass of a desired concentration upon the addition of a proper quantity of water.

10. The process of making water glass by mixing solid caustic soda, and hydrated silica having a moisture content of not more than 15% by weight, and subsequently adding water to produce the desired concentration.

11. A mixture of solid caustic soda and hydrated silica having a moisture content of not more than 15% by weight adapted to form a liquid water glass of a desired concentration upon the addition of a proper quantity of water.

LOUIS SCHNEIDER.